United States Patent [19]

Etoh

[11] Patent Number: 4,670,845
[45] Date of Patent: Jun. 2, 1987

[54] SYSTEM AND METHOD FOR AUTOMATICALLY CONTROLLING VEHICLE SPEED

[75] Inventor: Yoshiyuki Etoh, Kanagawa, Japan

[73] Assignee: Nissan Motor Company, Limited, Japan

[21] Appl. No.: 660,958

[22] Filed: Oct. 15, 1984

[30] Foreign Application Priority Data

Dec. 6, 1983 [JP] Japan ................................ 58-229042

[51] Int. Cl.[4] ........................ G06F 15/50; B60T 7/12; B60K 31/00
[52] U.S. Cl. .................................... 364/461; 180/169; 180/170; 340/903; 364/426; 364/460
[58] Field of Search ............... 180/167, 168, 169, 170; 340/903; 364/424, 426, 460, 461

[56] References Cited

U.S. PATENT DOCUMENTS

| 3,790,780 | 2/1974 | Helmcke et al. | 246/187 |
|---|---|---|---|
| 3,874,475 | 4/1975 | Permut et al. | 180/98 |
| 4,095,666 | 6/1978 | Baba et al. | 180/169 |
| 4,158,841 | 6/1979 | Wuchner et al. | 343/7 VM |
| 4,342,279 | 8/1982 | Seko et al. | 116/31 |
| 4,401,181 | 8/1983 | Schwarz | 180/168 |
| 4,450,438 | 5/1984 | Seko et al. | 340/576 |
| 4,491,840 | 1/1985 | Nishikawa et al. | 340/903 |
| 4,519,469 | 5/1985 | Hayashi et al. | 180/169 |
| 4,621,705 | 11/1986 | Etoh | 180/169 |
| 4,622,636 | 11/1986 | Tachibana | 364/424 |

FOREIGN PATENT DOCUMENTS

| 3034199 | 1/1959 | Fed. Rep. of Germany . | |
| 2900461 | 7/1980 | Fed. Rep. of Germany | 180/169 |
| 837133 | 6/1960 | United Kingdom . | |
| 2139036 | 10/1984 | United Kingdom . | |

Primary Examiner—Felix D. Gruber
Attorney, Agent, or Firm—Lane and Aitken

[57] ABSTRACT

A system and method for detecting a distance from a vehicle to an obstacle in front of the vehicle and controlling the vehicle according to changes in the distance thereof holds the vehicle speed constant upon recognition of the fact that the detected obstacle is a plurality of regularly spaced, stationary objects disposed along a side of a curved road and otherwise the vehicle speed is controlled on the basis of the distance between the vehicle and detected obstacles such as other vehicles moving in front of the vehicle or obstacles resting on the road as the vehicle moves through a curve.

13 Claims, 9 Drawing Figures (a)

(b)

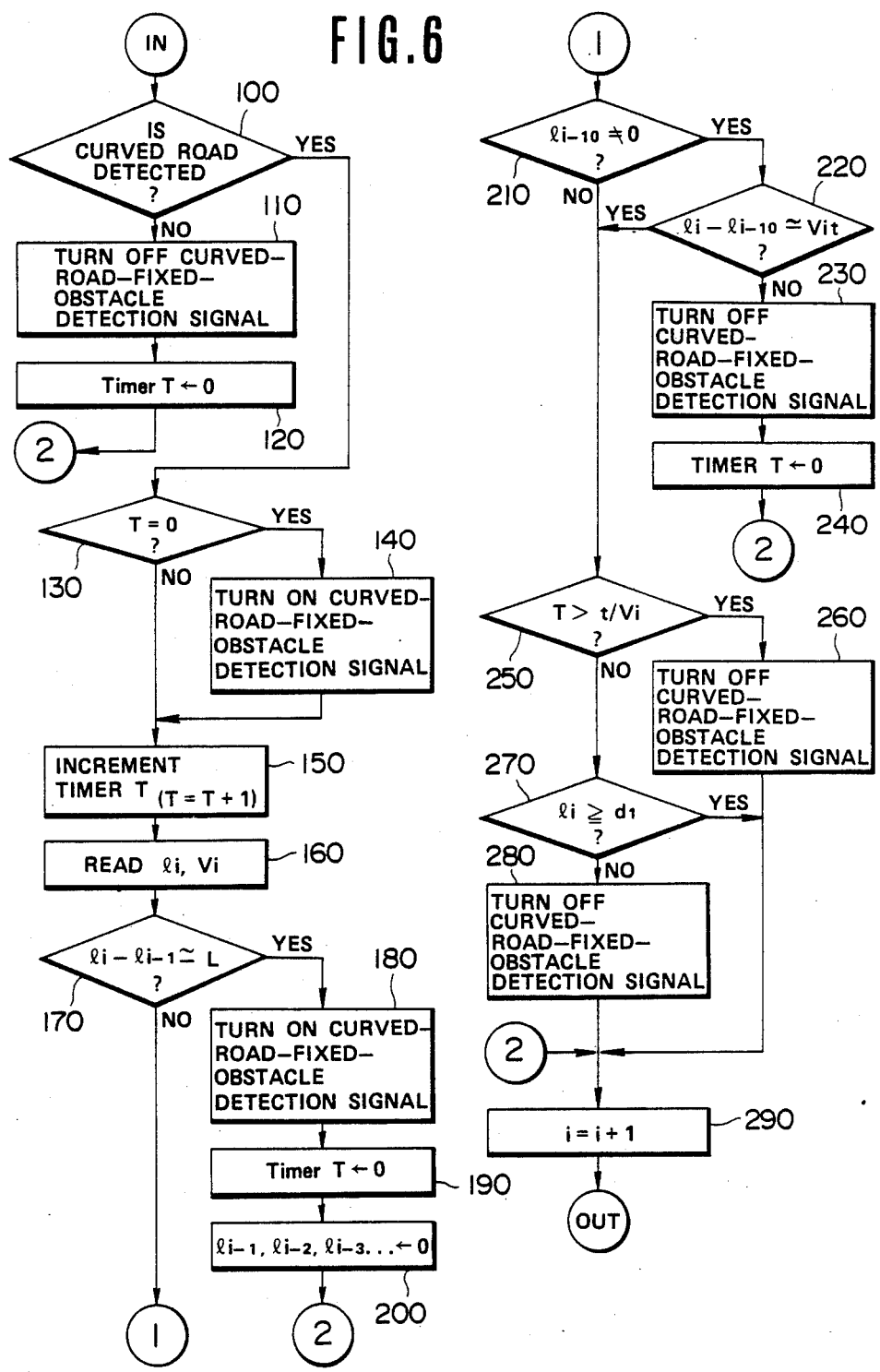

4,670,845

SYSTEM AND METHOD FOR AUTOMATICALLY CONTROLLING VEHICLE SPEED

BACKGROUND OF THE INVENTION

1. Field of the Invention

The present invention relates to a system and method for automatically holding vehicle speed at a cruising speed and automatically controlling the vehicle speed so as to follow a preceding vehicle at a safe inter-vehicle distance, and specifically relates to a system and method therefore which can appropriately track the preceding vehicle along a curved road.

2. Description of the Prior Art

Along with the recent development of automatic cruise control systems which move the vehicle at a constant, set speed, various systems have been proposed for controlling vehicle speed so as to automatically track a leading veicle at a safe inter-vehicle distance when the automatic cruise control system is actuated in order to prevent a rear-end collision of the preceding vehicle and to improve the drivability of the vehicle.

Conventional systems as described above are exemplified in Japanese Patent Application Open No. 58-43009 now U.S. Pat. No. 4,519,469.

The structure of the system disclosed in the above-identified document is shown in FIG. 1. In FIG. 1, a radar unit 1 monitors the distance between the vehicle (hereinafter referred to as the first vehicle) and an obstacle preceding and moving essentially parallel to the first vehicle. A vehicle speed sensor 3 monitors the vehicle speed. An arithmetic operation circuit 5 controls the vehicle speed via a throttle valve opening angle control circuit 7 on the basis of the distance detected by the radar unit 1 and the vehicle speed detected by the sensor 3 such that the vehicle automatically follows the obstacle at a safe intervehicle distance. In addition, the arithmetic operation circuit 5 controls the vehicle speed so as to hold the vehicle constant speed when the circuit 5 receives a signal from a curved road detection circuit 11 indicating that the vehicle is travelling on a curved road. The curved road detection circuit 11 recognizes that the vehicle is moving along a curved road when a steering angle sensor 9 outputs a signal indicating that a steering wheel is rotated through greater than a predetermined angle.

Since the directivity of the radar unit 1 is limited to the direction of travel, the system must take measures to prevent erroneous vehicle speed control due to erroneous results from the radar unit 1 which may not be measuring the distance from the vehicle to the preceding vehicle S, but rather to a reflector mounted on a guard rail or the like, as shown in FIG. 2(a).

However, the system disclosed in the above-identified document still has a problem in that since the vehicle speed is held just as it was when the first vehicle was trailing another vehicle, the vehicle speed is not suitably controlled in cases where the other vehicle approaches or pulls away from the first vehicle as it passes through a long curve. That is to say, in a specific case in which the first vehicle Z abruptly approaches the preceding vehicle S as they move through a curve as shown in FIG. 2(b), the vehicle driver will need to control the vehicle speed manually to decelerate the vehicle in accordance with the decrease in the intervehicle distance.

SUMMARY OF THE INVENTION

With the above-described problem in mind, it is an object of the present invention to provide in a system for automatically controlling the vehicle at a set cruising speed, the improvement of a system and method for appropriately controlling vehicle speed even as the vehicle moves through a curve.

To achieve the above-described object, the system, as shown in FIG. 3, comprises: (a) means (13) for monitoring the distance between the vehicle and an obstacle present in front of the vehicle and outputting a first signal indicative thereof; (b) means (15) for monitoring vehicle speed and outputting a second signal indicative thereof; (c) means (21) for recognizing whether the obstacle is a stationary object located near the road on which the vehicle is moving on the basis of said first and second signals and outputting a third signal indicative thereof; and (d) means (23) for controlling the vehicle speed so as to hold the vehicle speed constant while receiving the third signal and for controlling the vehicle speed according to the values of the first and second signals in the absence of the third signal.

In a preferred embodiment shown in FIG. 4, the distance monitoring means (a) refers to a radar 25, the vehicle speed monitoring means (b) refers to a vehicle speed sensor 27, the stationary object recognizing means (c) refers to a curved road fixed obstacle detector 33, the vehicle speed controlling means (d) refers to an arithmetic processor 35 and throttle valve opening angle actuator 37.

The system of the invention shown in FIG. 4 comprises: (a) first means (29, 31) for detecting whether the vehicle is moving through a curve and outputting a first signal when it is moving through the curve; (b) second means (27) for detecting vehicle speed and outputting a second signal indicative thereof; (c) third means (25) for detecting the distance from the vehicle to an obstacle in front of the vehicle and outputting a third signal indicative thereof; (d) fourth means (33) responsive to said first signal for detecting stationary obstacles near the curve on the basis of the third signal and outputting a fourth signal when such obstacles are detected; and fifth means (35, 37) responsive to the fourth signal for controlling the vehicle speed so as to hold the vehicle speed constant, the third means being a light radar unit and the fourth means detecting each of a plurality of reflectors spaced along the side of the curve at regular intervals and outputting the fourth signal when the difference between the values of the present third signal and a previous third signal sampled a predetermined interval of time before the present third signal is substantially equal to the regular interval.

BRIEF DESCRIPTION OF THE DRAWINGS

A more complete understanding of the present invention may be obtained from the following description in conjunction with the attached drawings in which:

FIG. 6 is a processing flowchart of the curved road fixed obstacle detection circuit shown in FIG. 4.

DETAILED DESCRIPTION OF PREFERRED EMBODIMENTS

Reference will be made to the drawings in order to facilitate understanding of the present invention.

Figure 4:
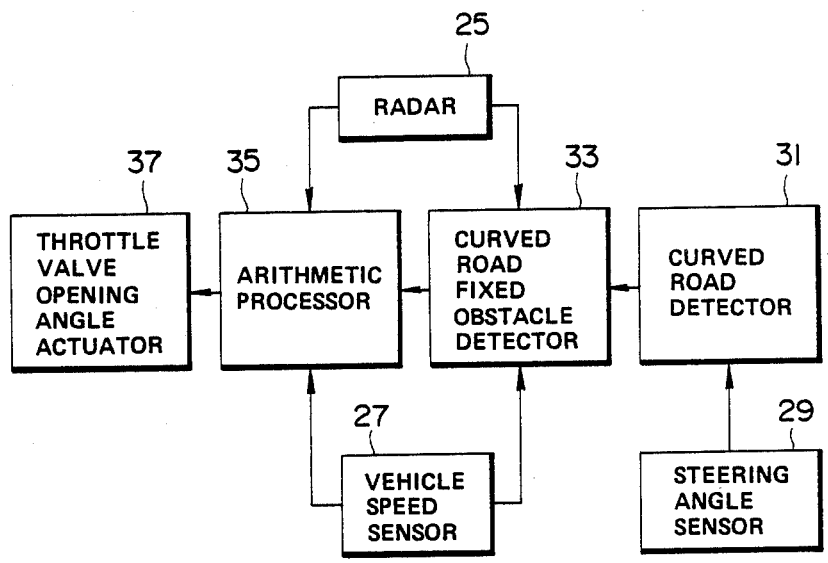
FIG. 4 is a circuit block diagram of the system of the preferred embodiment.

FIG. 4 shows a preferred embodiment of the present invention. In FIG. 4, numeral 25 denotes the radar unit which monitors the distance between the vehicle and an obstacle present in front of the vehicle using a laser, ultrasonic waves, electromagnetic waves, etc. and outputs a distance signal indicative thereof. In this embodiment, a laser is used in the radar unit 25. The structure of light radar units is disclosed in U.S. patent applications Ser. No. 579,694 filed on Feb. 13th, 1984, now U.S. Pat. No. 4,632,543 and Ser. No. 593,491 filed on Mar. 26th, 1984 which corresponds to U.K. Patent Application No. 2,139,036. The contents of these documents are hereby incorporated by reference.

Numeral 27 denotes a vehicle speed sensor which monitors the vehicle speed and outputs a vehicle speed signal indicative thereof. Numeral 29 denotes a steering angle sensor which monitors the angle through which the steering wheel is rotated and outputs a steering signal pulse whenever the steering wheel is rotated through a predetermined unit angle either clockwise or counterclockwise. The structure of the steering angle sensor 29 and a curved-road detector 31 to be described later are disclosed in U.S. patent application Ser. No. 309,012 filed on Oct. 5th, 1981 U.S. Pat. No. 4,450,438. The contents of the above-identified document are hereby incorporated by reference.

Numeral 31 denotes a curved road detector which detects whether or not the vehicle is travelling along a curved road from the output signal of the steering angle sensor 29. Numeral 33 denotes a curved-road-fixed-obstacle detector comprising a microcomputer which processes output signals from the radar unit 25 and vehicle speed sensor 27, determines whether the preceding obstacle detected by the radar unit 25 is a stationary obstacle located along a curved road (for example, a reflector on a guard rail), and outputs a signal indicating whether or not the obstacle is stationary (reflector). Numeral 35 denotes an arithmetic processor which controls a throttle valve opening angle actuator 37 so as to govern the vehicle speed on the basis of the signals from the radar unit 35, vehicle speed sensor 27, and curved-road-fixed-obstacle detector 33.

Figure 1:
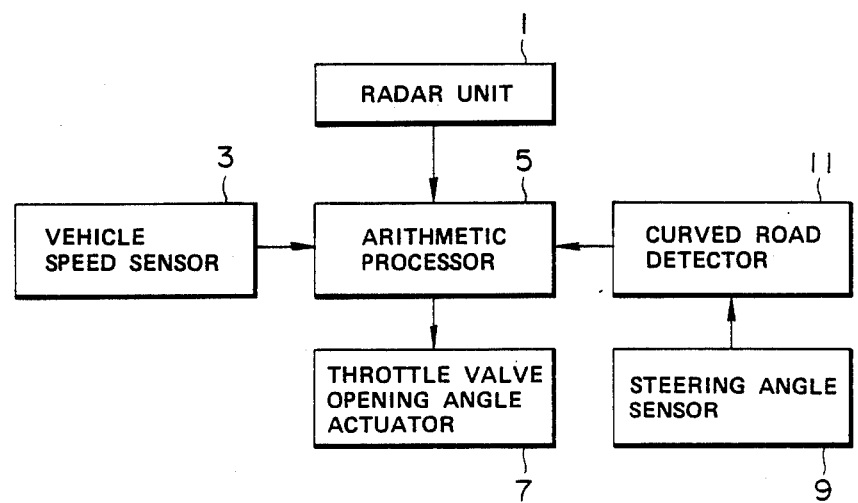
FIG. 1 is a functional block diagram of a conventional vehicle speed control system disclosed in Japanese Patent Application Open No. 58-43009.
Figure 2:
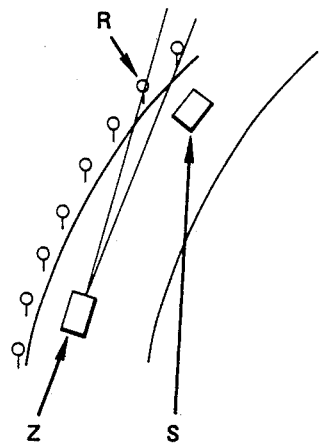
FIG. 2(a) and FIG. 2(b) are schematic drawings of the detection area over which a radar unit detects obstacles located in front of the vehicle as it moves through a curve.
Figure 2:
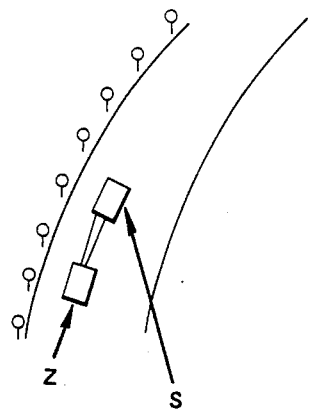
Figure 3:
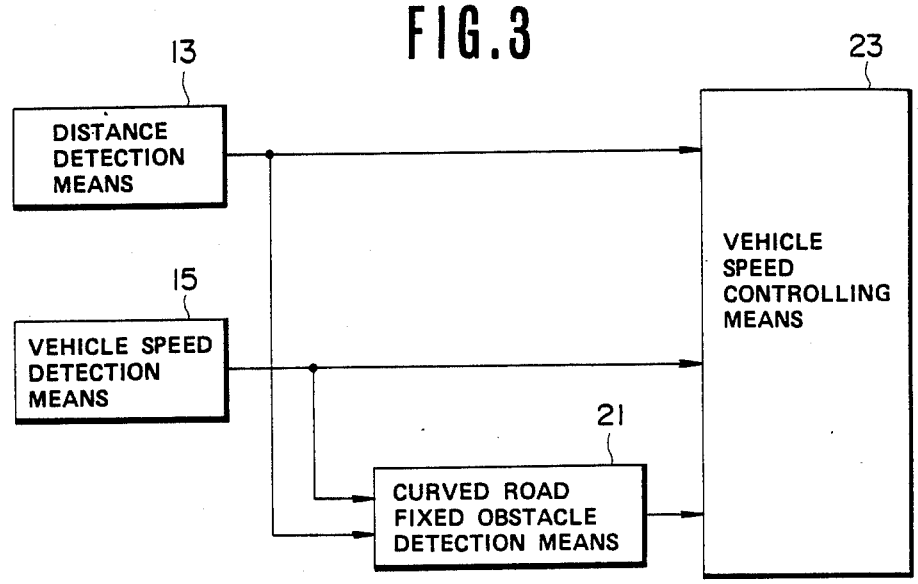
FIG. 3 is a functional block diagram of a preferred embodiment of the present invention.

It should be noted that although reflectors are usually installed at intervals of 20 to 30 meters, on a curve of average radius, the reflectors directly in front of the vehicle will have an apparent lateral spacing of only 2 or 3 meters. Thus, since the laser light beam used in the preferred embodiment has a diameter of 6 meters at a distance of 30 meters ahead the vehicle, the radar unit receives reflected light beams from two reflectors as shown in (a) of FIG. 2. However, the radar unit 25 gives priority to the light reflected by the reflector which is close to the vehicle.

Next, the theory of operation of the curved-road-fixed-obstacle detector detector 33 will be described below.

Figure 5:
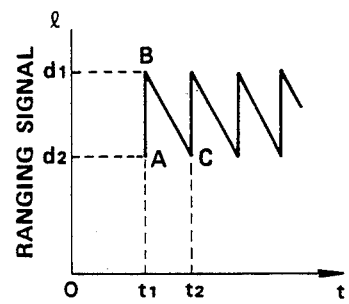
FIGS. 5(a), 5(b), 5(c) are graphs of ranging patterns of the radar unit versus time in the preferred embodiment during movement through a curve.
Figure 5:
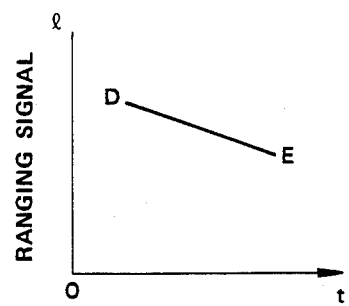
Figure 5:
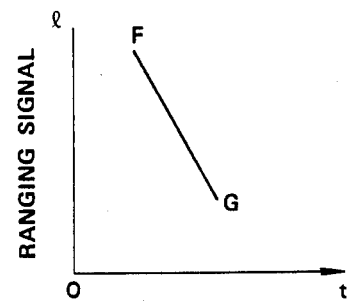

As the radar unit 25 ranges reflectors spaced at regular intervals L (e.g. 30 meters) along a guard rail alongside a curved road, the trace of the received detection signal with respect to time is shown in FIG. 5(a). As the vehicle moves through a curve, each detected reflector appears to approach at the current vehicle speed V until it reaches a point at which it exits the radar beam again, such as at A in FIG. 5(a). At that point, the reflector effectively vanishes and its trace is replaced by that of the next reflector, which appears at a distance $d_2$ equal to the sum of the lower detection limit $d_1$ and the spacing L, as at B in FIG. 5(a). This next reflector approaches at speed V until it in turn vanishes at point C, so that the cycle A-B-C is repeated for each reflector at an essentially constant period $(t_2-t_1)$ throughout the curve. The following expressions hold in this case:

$$t_2 - t_1 = L/V$$

$$d_2 - d_1 = L$$

In addition, since the approaching speed with respect to the reflectors is constant (V), the gradient of straight line $\overline{BC}$ is $-V$. This is of course true for any stationary obstacle along the road. The trace of the radar ranging signal with respect to time for such an obstacle is shown at line F-G in FIG. 5(c).

On the other hand, as the vehicle (vehicle speed: V) approaches a preceding vehicle (vehicle speed: V'(<V)), the trace of the ranging signal with respect to time is also linear as shown at line D-E in FIG. 5(b). In this case, since the leading obstacle toward which the vehicle is approaching is also moving, the gradient of the line D-E can be expressed as $-(V-V')$. As appreciated from FIGS. 5(a) through 5(c), the slope of line D-E is shallower than that of the other two lines B-C and F-G.

Hence, the curved-road-fixed-obstacle detector 33 can determine whether or not the obstacle is another vehicle travelling in front of the first vehicle from the gradients of such straight lines. In addition, the curved-road-fixed-obstacle detector 33 can determine whether the difference between ranges detected at a constant frequency is equal to the predetermined spacing between reflectors. If the ranging characteristics shown in FIG. 5(b) are recognized, the fixed-obstacle detector 33 blocks the effect of curve detector 31; that is, in this case, the leading vehicle is tracked at a safe distance. On the other hand, if ranging behavior such as shown in FIGS. 5(a) and (c) occurs, the fixed-obstacle detector 33 signals the arithmetic processor 35 to hold vehicle speed constant.

The operation of the curved-road-fixed-obstacle detector 33 will be described with reference to an operational flowchart shown in FIG. 6. It should be noted that the operational flowchart is an interrupt routine triggered at regular intervals (for example, 100 milliseconds).

In initial step 100 of the interrupt routine, the curved road detector 31 determines whether or not the vehicle is moving through a curve and outputs an output signal if so.

If the detector 33 does not receive the output signal from the curved-road detector 31, i.e., if the vehicle is moving along a straight road, the detector 33 turns OFF or leaves OFF a curved road fixed obstacle detection signal in step 110, a timer (timer register) T is cleared (T=0) in step 120, and an interrupt timing register i, which counts the cycles of execution of the interrupt routine, is incremented in step 290.

If the curved-road detector 31, determines that the vehicle is moving through a curve in step 100, the routine goes to step 130.

In the step 130, the contents of the timer register T are checked. If the contents of the timer T is 0, i.e. if the vehicle has just entered a curve, the curved-road-fixed-obstacle detection signal is outputted in step 140 to hold the vehicle at the speed it had immediately before entering the curve. After either step 130 or step 140, the contents of timer T is incremented in step 150(T=T+1). In the next step 160, the detector 33 reads the values of the ranging signal $l_i$ from the radar unit 25 and the vehicle speed signal Vi from the vehicle speed sensor 27. Thereafter, the routine goes to step 170 in order to determine whether or not the obstacle detected by the radar unit 25 on the basis of these input signals is a reflector.

In step 170, the detector 33 calculates the difference between the values of the two most recent ranging signals $(l_i - l_{i-1})$ and compares the calculated difference with a predetermined spacing value L. This comparison step 170 is designed to detect transitions such as occurred between points A and B in FIG. 5(a).

A detailed description of the step 170 will be made with reference to FIG. 5(a). The radar unit 25 outputs the distance signal to the detector 33 in which smaller distance values have a higher priority than larger distance values should two reflectors A and B be within the range of detection of the radar unit 25. Consequently, the ranging signal for the reflector A is continuously outputted until it leaves the detection area of the radar unit 25 and immediately thereafter, i.e., within the 0.1 second interval between interrupts, the ranging signal for the reflector B is outputted. As the vehicle continues to run, the reflectors B and C pass through the detection area of the radar unit 25.

It should be noted the interrupt timing of this processing routine is so selected as to allow the distance between the vehicle and the reflectors to be sampled several times for each reflector. If $(l_i - l_{i-1}) = L$ in the step 170, the detector 33 recognizes that the obstacle detected by the radar unit 25 is a reflector. In order to hold the vehicle speed constant, the routine goes to step 180 wherein the curved-road-fixed-obstacle detection signal is turned on, goes to step 190 wherein the value of timer T is zeroed, and goes to step 200 wherein the values $l_{i-1}$, $l_{i-2}$, . . . read and stored in the previous interrupt processing routines are cleared. Thereafter, the routine goes to step 290.

If the difference between successive ranging signals $l_n$ and $l_{n-1}$ does not match the reflector spacing L, control passes to step 210, wherein the detector 33 determines whether the ranging signal value $l_{i-10}$ inputted during the interrupt processing routine a predetermined number of times greater than the number required to pass from one reflector to the next (for example, 10 times = 1 second) prior to the current cycle is non-zero. If $l_{i-10} \neq 0$ in the step 210, the routine goes to step 220 wherein the difference between the values of the ranging signals $l_{i-10}$ and $l_i$ is calculated and the calculated difference is compared with the product of the vehicle speed signal Vi and the time required for the given number of cycle, in this case 1 second. If $l_i - l_{i-10} = $ Vi in the step 220, the routine goes to step 250. Since $l_i - l_{i-10}$ corresponds to the distance covered by a single object and Vi×T corresponds to the distance covered by the vehicle over the same period, the detector 33 recognizes in this case that the radar unit 25 is tracking a single stationary obstacle. On the other hand, if $l_i - l_{i-10} \neq $ Vi in the step 220, then the tracked object must be moving, as in FIG. 5(b) and the routine goes to step 230 wherein the curved-road-fixed-obstacle detection signal is turned off, step 240 wherein the timer T is zeroed (T=0), and finally the step 290. If $l_{i-10} = 0$ in the step 210, the routine goes directly to the step 250.

In the step 250, the contents of timer register T is compared with the value L/Vi. If T>L/Vi in the step 250, the detector 33 recognizes that the vehicle has not been moving through the curve long enough to distinguish among FIGS. 5(a)–(c) and turns off the output of the curved-road-fixing-obstacle detection signal in step 260, thus permitting vehicle speed control according to the distance to the detected obstacle. Thereafter, the routine goes to the step 290. If T≤(L/Vi) in the step 250, the routine goes to step 270 wherein the value of the ranging signal $l_i$ is compared with the limit distance $d_1$ within which the radar unit 25 cannot detect reflectors. Consequently, if $l_i < d_1$ in the step 270, the detector 33 recognizes that the obstacle detected by the radar unit 25 must be another vehicle appearing abruptly in front of the vehicle and turns of the curved-road-fixed-obstacle detection signal in order to control the vehicle speed according to the inter-vehicle distance to the newly detected vehicle. Thereafter, the routine goes to the step 290. On the other hand, if $l_i \geq d_1$ in the step 270, the routine goes directly to the step 290 wherein the interrupt timing registor 1 is incremented (i=i+1).

In the interrupt processing routine described above, the curved-road-fixed-obstacle detection signal is turnd on and remains on only when the obstacle detected by the radar unit 25 is a reflector or other stationary object. In other cases, the curved-road-fixed-obstacle detection signal is turned off so that the vehicle speed is controlled according to the ranging signal from the radar unit 25.

The operation of the overall system is summarized below.

The curved road detector 31 receives the steering angle signal pulses from the steering angle sensor 29. The structure of steering angle sensor 29 is detailed in U.S. Pat. No. 4,342,279, U.S. patent applications Ser. No. 304,254, Ser. No. 377,268, Ser. No. 377,206, Ser. No. 377,198, Ser. No. 326,393, and Ser. No. 326,392. The corresponding Patent Numbers are: U.S. Pat. Nos. 4,463,347, 4,518,954, 4,564,833, 4,586,032, 4,509,040, 4,496,938. The contents of these documents are hereby incorporated by reference. The curved-road detector 31 signals that the vehicle is moving through a curve when the angle through which the steering wheel of the vehicle is rotated exceeds a predetermined angle and outputs the curved-road signal indicative thereof. In other cases, the curved road detector 31 does not output the curved road running signal.

When the vehicle is moving along a straight road, since the curved-road-fixed-obstacle detection signal remains off, the arithmetic processor 35 actuates the throttle valve opening angle actuator 37 on the basis of the signals from the radar unit 25 and vehicle speed sensor 27 so that the vehicle speed is controlled according to the distance to the nearest preceding obstacle.

On the other hand, when the vehicle is moving through a curve, the curve-road-fixed-obstacle detector 33 receives the curved-road signal from the curved-road detector 31 and turns on the curved-road-fixedobstacle detection signal. In response to the "ON" signal from the corved-road-fixed-obstacle detector 33, the arithmetic processor 35 controls the throttle valve actuator in such a way that the vehicle speed remains unchanged. Next, the curved-road-fixed-obstacle detector 33 determines whether or not the obstacle is a reflector or other stationary object. If the front obstacle is determined to be a reflector or the like, the curved-road-fixed-obstacle detection signal remains on. Therefore, the arithmetic processor 35 holds the vehicle speed constant. On the other hand, if the obstacle is determined not to be a reflector or the like, the curved-road-fixed-obstacle detection signal is turned off. The arithmetic processor 35, in response to the "OFF" signal from the curved-road-fixed-obstacle detector 33, controls the vehicle speed according to the distance to the preceding obstacle as in the case of movement along a straight road.

As described above, according to the present invention, the system and method for automatically controlling the vehicle speed detects the distance to a nearest obstacle present in the direction of travel and controls the vehicle speed according to this distance when the obstacle is a leading vehicle and holds the vehicle speed constant in cases where the detected obstacle is a stationary object located on the side of a curved road. Therefore, the system and method can achieve appropriate speed control both when the vehicle is approaching another vehicle moving in front of the first vehicle and when approaching a stationary obstacle resting near the road as the vehicle moves through a curve.

It will be fully understood by those skilled in the art that the foregoing description is made in terms of the preferred embodiment and various changes and modifications thereof may be made without departing from the scope of the present invention, which is to be defined by the appended claims.

What is claimed is:

1. A method for automatically maintaining a vehicle speed at a set cruising speed when there are no vehicles in front of the vehicle and moving in the same direction and otherwise controlling the vehicle speed according to the distance from the vehicle to an obstacle in front of the vehicle, comprising the steps of:
   (a) detecting when the vehicle is moving through a curve;
   (b) monitoring the distance from the vehicle to an obstacle in front of the vehicle;
   (c) recognizing that the obstacle in front of the vehicle as it moves through a curve is one of a plurality of regularly spaced, stationary obstacles disposed along a side of a curve in a road when the distance monitored in said step (b) abruptly changes by a predetermined amount; and
   (d) holding the vehicle speed constant when the conditions of step (c) are satisfied.

2. A system for automatically maintaining a vehicle speed at a set cruising speed when there are no vehicles moving within a given distance in front of the vehicle and otherwise controlling the vehicle speed according to the distance from the vehicle to an obstacle present in front of the vehicle, comprising:
   (a) means for monitoring the distance between the vehicle and an obstacle present in front of the vehicle and outputting a first signal indicative thereof;
   (b) means for monitoring vehicle speed and outputting a second signal indicative thereof;
   (c) means for recognizing whether the obstacle is a stationary object located near the road on which the vehicle is moving on the basis of said first and second signals and outputting a third signal indicative thereof when the difference between the present value and previous value of said first signal substantially equals a predetermined value; and
   (d) means for controlling the vehicle speed so as to hold the vehicle speed constant while receiving the third signal and for controlling the vehicle speed according to the values of the first and second signals in the absence of the third signal.

3. The system as set forth in claim 2, wherein the previous value of said first signal is indicative of the distance between the vehicle and an obstacle sampled 100 milliseconds before the present value.

4. The system as set forth in claim 2, wherein said stationary object recognizing means includes second vehicle recognizing means for recognizing whether a second vehicle is travelling in front of the vehicle on the basis of the first and second signals and for outputting a fourth signal indicative thereof, and wherein said stationary object recognizing means does not output a third signal when the fourth signal is outputted by said second vehicle recognizing means.

5. The system as set forth in claim 4, wherein said second vehicle recognizing means outputs the fourth signal when the difference between the present value of said first signal and a previous value thereof obtained a predetermined time prior to the present value substantially equals the value of the secnd signal multiplied by said predetermined time.

6. The system as set forth in claim 2, wherein said stationary object recognizing means includes second vehicle recognizing means for detecting that a second vehicle has moved in front of the running vehicle at a distance less than is normally maintained between vehicles and outputting a fifth signal indicative thereof, and whereby said stationary object recognizing means does not output the third signal when said fifth signal is outputted by said second vehicle recognizing means.

7. A system for automatically maintaining a vehicle speed at a set cruising speed when there are no vehicles within a given distance in front of the vehicle and otherwise controlling the vehicle speed according to the distance from the vehicle to an obstacle in front of the vehicle, comprising:
   (a) first means for detecting when the vehicle is moving through a curve and outputting a first signal in such cases;
   (b) second means for detecting vehicle speed and outputting a second signal indicative thereof;
   (c) third means for detecting the distance from the vehicle to an obstacle in front of the vehicle and outputting a third signal indicative thereof;
   (d) fourth means responsive to said first signal for detecting stationary obstacles near the curve on the basis of said third signal and outputting a fourth signal when such obstacles are detected; and
   (e) fifth means responsive to said fourth signal for controlling the vehicle speed so as to hold the vehicle speed constant.

8. The system as set forth in claim 7, wherein said third means is a light radar unit and said fourth means detects each of a plurality of reflectors spaced along the side of the curve at regular intervals and outputs the fourth signal when the difference between the values of the present third signal and a previous third signal sampled a predetermined interval of time before the present third signal is substantially equal to said regular interval.

9. The system as set forth in claim 7, wherein said fifth means controls the vehicle speed according to the indications of said second and third signals when said fourth means outputs no fourth signals.

10. A system for automatically maintaining a vehicle speed at a set cruising speed when there are no vehicles within a given distance in front of the vehicle and otherwise controlling the vehicle speed according to the distance from the vehicle to an obstacle in front of the vehicle, comprising:

(a) first means for detecting that the vehicle is moving through a curve and outputting a first signal in such cases;

(b) second means for detecting vehicle speed and outputting a second signal indicative thereof;

(c) third means for detecting the distance from the vehicle to an obstacle within a given range of distance in front of the vehicle and outputting a third signal indicative thereof;

(d) fourth means responsive to said first signal for discriminating whether the obstacle in front of the vehicle is a stationary object located along the side of the curve, a second vehicle in front of the vehicle and moving in the same direction, an obstacle resting on the curve, within an outer limit of said given range of distance on the basis of the indications of said second and third signals, and outputting a fourth signal when the obstacle in front of the vehicle is a stationary object located along the side of the curve; and (f) fifth means responsive only to said fourth signal for holding the vehicle speed constant.

11. The system as set forth in claim 10, wherein said fourth means recognizes that the obstacle in front of the vehicle is a stationary object disposed along the side of the curve when the difference between the values of the third signals at the present time and at a first perdetermined time prior to the present is substantially equal to a predetermined value.

12. The system as set forth in claim 11, wherein said fourth means recognizes that the obstacle in front of the vehicle is an obstacle resting on the curved road when the difference between values of said third signal at the present time and at a point a second predetermined time prior to the present time is substantially equal to the present value of said second signal times said second predetermined, and the obstacle is not recognized as being a stationary object disposed along the side of the curve.

13. The system as set forth in claim 10, wherein said fourth means recognizes that the obstacle in front of the vehicle is a second vehicle in front of the vehicle and moving in the same direction when the difference between the values of the third signals at the present time and at a second predetermined time prior to the present, said second time being longer than said first predetermined time, is not substantially equal to the present value of said second signal multiplied by said second time.

* * * * *